United States Patent [19]

Marstall

[11] Patent Number: 4,800,664
[45] Date of Patent: Jan. 31, 1989

[54] MAP HOLDER

[76] Inventor: Jerry Marstall, 207 Sandy Pond Rd., Lincoln, Mass. 01773

[21] Appl. No.: 34,924

[22] Filed: Apr. 6, 1987

[51] Int. Cl.⁴ .............................................. G09F 3/18
[52] U.S. Cl. ........................................ 40/661; 40/643; 40/904; 224/30 A
[58] Field of Search ............. 40/10 R, 10 A, 590, 40/591, 10 D, 593, 904; 224/273, 276, 30 A, 42, 45 R, 277

[56] References Cited

U.S. PATENT DOCUMENTS

| 1,759,544 | 5/1930 | Croes | 40/10 A |
| 1,834,260 | 12/1931 | Thompson | 40/10 A |
| 3,948,424 | 4/1976 | Hunn et al. | 224/30 A |
| 3,955,728 | 5/1976 | Jackson et al. | 224/30 A |
| 4,269,336 | 5/1981 | Humlong | 224/30 A |

FOREIGN PATENT DOCUMENTS 688912  3/1953  United Kingdom ............... 224/273

*Primary Examiner*—Gene Mancene
*Assistant Examiner*—Michael Lynch
*Attorney, Agent, or Firm*—Kimmel, Crowell & Weaver

[57] ABSTRACT

A map holder for vehicles having a compartment with a pivotal, transparent cover, a mounting base for supporting the compartment adjustably thereon, together with a single alignment pin on the compartment and a pair of alignment holes in the mounting base, and clamp structure together with adjustable support straps for affixing the mounting base on the handlebars of a motorcycle or bicycle. A modified embodiment provides an additional L-shaped angled bracket between the clamps and the respective support straps.

11 Claims, 1 Drawing Sheet

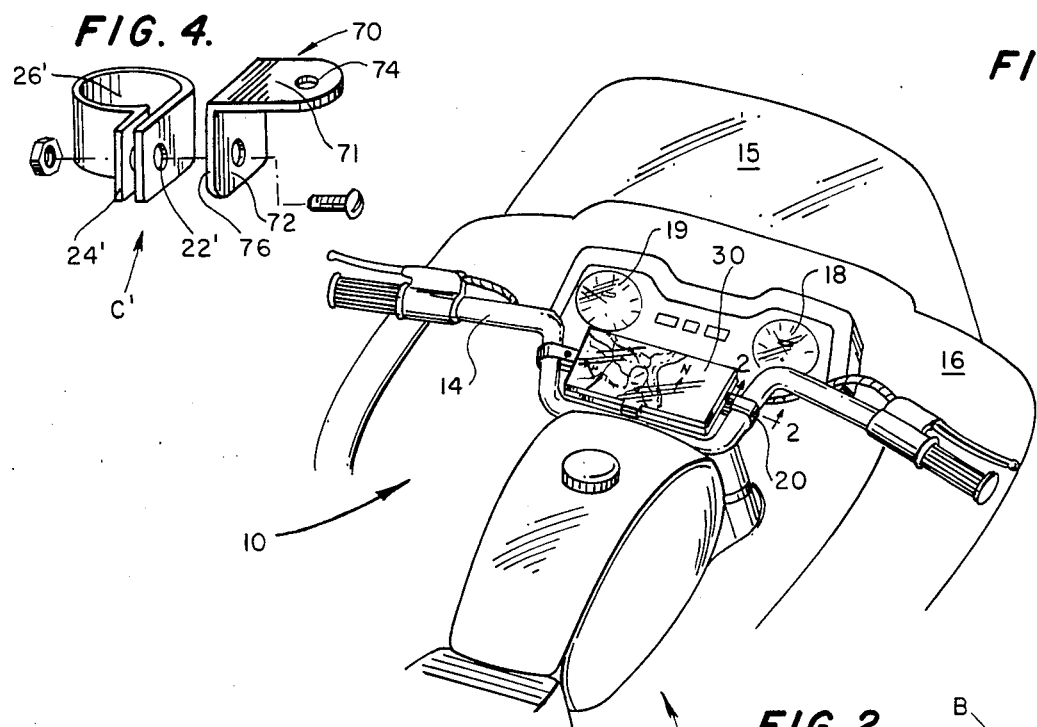
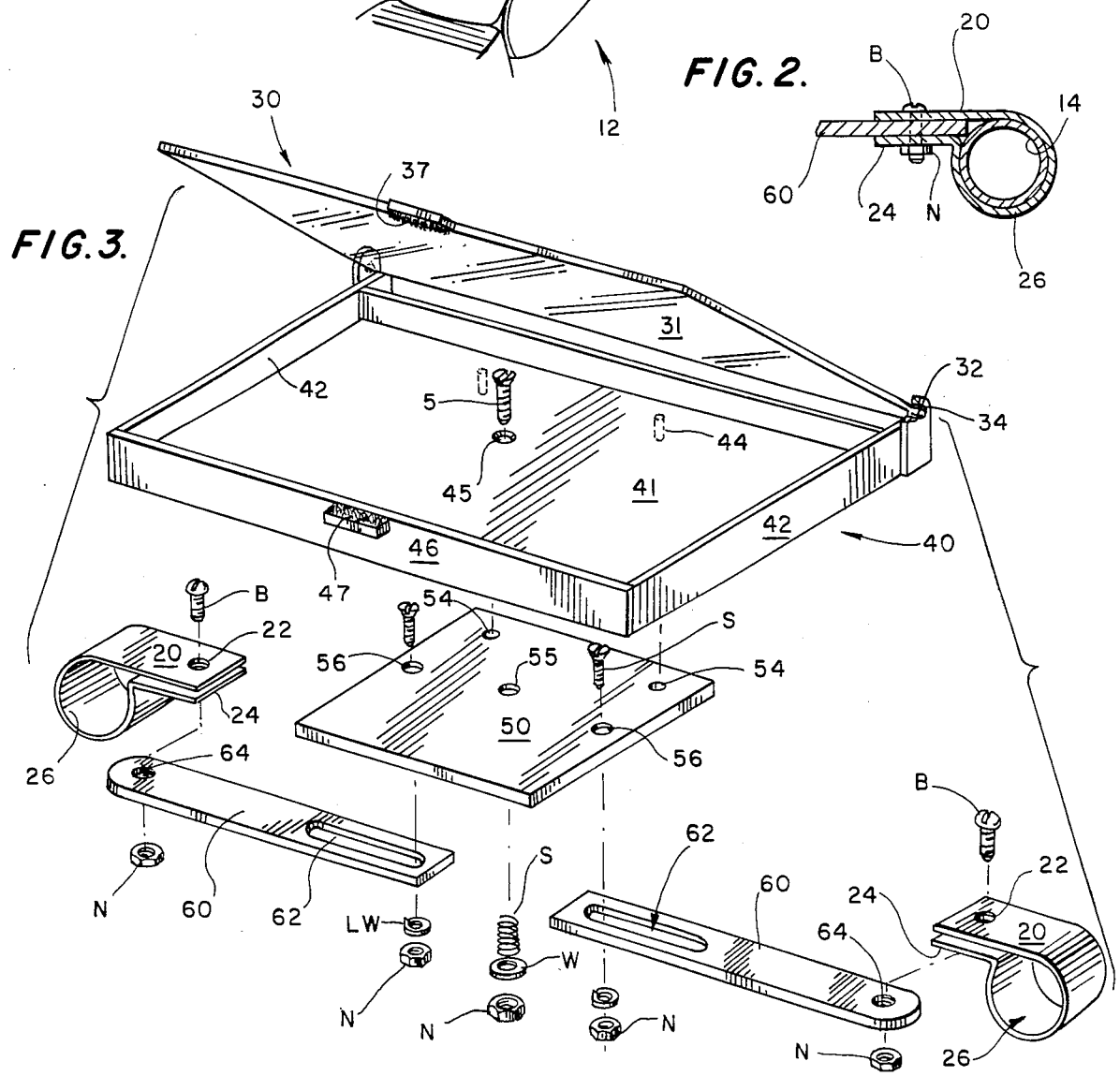

MAP HOLDER

BACKGROUND OF THE INVENTION

1. Field of the Invention

This invention relates generally to devices for holding maps, and especially to a map holder that can be used on various vehicles, such as motorcycles and the like, to position a map in an easily referenced location, and also which will protect the map from the elements.

2. Description of the Prior Art

A common problem with known devices for holding maps on vehicles is that they either are not sufficiently protective of a map so as to prevent the map from being damaged by elements, such as wind, rain, sleet and snow, or if they are so protective, then they are not oriented for easy use by a rider or driver of the vehicle.

For example, known type map holders for motorcycles, bicycles and the like can be mounted in view of the rider; however, they fail to permit sufficient flexibility in mounting so as to provide easy reference to the enclosed map, and also so that the holder can be rotated 90° to accommodate routes oriented North and South, or East and West.

Furthermore, known types of map holders are not adaptable enough for use in different types of situations, such as on a boat dash or a boat tiller, an aircraft steering yoke, a motorcycle or bicycle handlebar, and the like.

SUMMARY OF THE INVENTION

An object of the present invention is to provide a map holder for use with various types of vehicles which will protect an enclosed map from the elements, as well as provide easy and quick orientation thereof.

Another object of the present invention is to provide an easily installed device for holding maps on a motorcycle handlebar which can be quickly and easily adjusted to various positions thereon.

A still further object of the present invention is to provide a map holder which will be mountable upon various types of vehicles, which can be quickly and easily adjusted relative thereto, and which will provide protection for a map or maps from wind, rain, snow, sleet and the like.

Another further object of the present invention is to provide a map holder made of transparent material which will permit a map contained therein to be easily viewed, together with suitable clamping structure for attachment of same to a vehicle such as a motorcycle, and especially for attachment to the handlebars thereof.

The present invention has a number of new and novel features. Among them are a compartment having a transparent cover for containing a map therewithin and an attachment structure for affixing same to the handlebars of a motorcycle, bicycle, or the like. The attaching structure includes a base plate which is in turn attached through clamps and straps to the motorcycle handlebars. This structure permits flexibility in operation and use, in that the compartment can be oriented so as to be in a good viewing position, similar to the instrument panel of the motorcycle, etc. Also, it will permit the use of the device with other types of vehicles, such as on the tiller of a sail boat or dash panel of a power boat, the control yoke of an airplane or in a motor vehicle such as a van, as well as on a motorcycle or bicycle.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the present invention as installed on the handlebars of a motorcycle.

FIG. 2 is a cross-sectional view taken generally along line 2—2 of FIG. 1.

FIG. 3 is an exploded perspective view of the present invention per se, showing a first embodiment of the mounting structure.

FIG. 4 is a modified embodiment of the clamping bracket structure.

DESCRIPTION OF THE PREFERRED EMBODIMENT

Referring to FIG. 1 of the drawing, reference numeral 10 indicates in general the present invention. This map holder invention is shown mounted upon handlebars 14 of a motorcycle 12. The motorcycle 12 is shown as having a windshield 15, a wind fairing 16, and appropriate instrument gauges 18 and 19. So as to be in the line of sight of the motorcycle rider when looking at the gauges and the like on the instrument panel, the map holder 30 is mounted on the handlebars 14 as shown. As seen in FIGS. 2 and 3, a handlebar clamp has a flat portion 20, a complementary flat portion 24 opposite thereto, and a looped handlebar encircling portion 26. A bolt B and nut N are normally used to fasten the respective flat portions 20 and 24 to the outer end of mounting strap 60. Of course, the loops 26 of the clamp C are appropriately sized so as to securely fasten the strap 60 to the handlebars 14 when the nuts N have been tightened.

The map container itself comprises a pivotally mounted transparent cover or lid 31 mounted upon a container 40 having a bottom 41, side panels 42, a rear panel 44 and a front panel 46. A hole 45 is preferably provided at the center of bottom 41. The transparent lid 30 is provided with rear side pins 32 which complement and mate with holes 47 provided in the respective sides 42. The cover 30 also is provided with a Velcro hook and loop type fastener structure 37 to complement with similar structure 47 mounted on the front panel 46 of the container. The container itself may be opaque or transparent, as preferred by the maker.

Another important feature of the present invention is in the sub-base 50 which supports the container 40 rotatably thereupon. A tapered head screw S through a countersunk hole 45 in the container and a mating hole 55 in the plate provide the connection. A spring S, together with washer W and nut N, retain the container upon sub-base 50 once mounted thereupon. Additional screws S passing through countersunk holes 56 and slots 62 of the straps 60 permit attachment and adjustment of the sub-base 50 to the mounting straps as affixed to the handlebars. Appropriate lock washers LW and nuts N secure this attachment once made. It should be noted that the bottom 41 of container 40 is provided on the underside with a pin 44 which can mate with either of the holes 54 in the sub-base 50. This permits the container to be oriented substantially transversely to the moving axis of the motorcycle or in parallel therewith. Thus, this adjustment makes it easy to orient the map in a North and South or East and West orientation. The rounded ends 63 of strap 60 permit relative movement of the straps and the clamp C.

Another modification of the above preferred embodiment is depicted in FIG. 4. In FIG. 4 an L-shaped bracket 70 is shown which is provided with two angled surfaces 71 and 72. The L-shaped angle is less than 90°, which permits maximum flexibility and adjustment between the clamp C' and the rounded ends 63 of the strap 60. The clamp C' has opposite flat surfaces 22' and 24' similar to those of the first embodiment, and also an encircling hoop 26'. Appropriate bolts and lock nuts are used to affix the L-shaped bracket 70 to clamp C' as in the first embodiment, and then similar bolts, nuts and washers are used to affix portion 71 through aperture 74 to the strap 60.

As can be easily visualized, this map holder offers a number of new and novel features, and is very helpful to a motorcyclist and/or other vehicle operator when actually busy with riding and maneuvering of the vehicle. The holder protects the map from the elements and also allows flexibility as to orientation thereof.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A map holder for motorcycles and the like, comprising:

a compartment having a bottom and sides for holding a map therein;

a pivotally mounted transparent cover for said compartment;

a separate mounting base for supporting said compartment;

means for adjustably mounting said mounting base on the handlebars of a motorcycle; and means for mounting and aligning said compartment on said mounting base, said mounting and aligning means comprising a pivotal connection between the mounting base and compartment bottom and enabling said compartment to be pivoted in the plane of the bottom, said pivotal connection including a pivot pin connected between the compartment bottom and the mounting base, resilient biasing means engaged between the compartment bottom and the mounting base for urging them yieldably toward one another, and interengaged detent means on the bottom and mounting base for detaining said compartment in a positively located pivotally adjusted position on the mounting base, whereby a map or the like held in said compartment can be oriented to specific different positions, said biasing means acting to hold the detent means in engaged position but enabling it to be overridden.

2. The map holder of claim 1, wherein said means for adjustably mounting said mounting base on the handlebars include a clamp having a portion encircling a portion of said handlebars, and support straps between said clamps and said mounting base.

3. The map holder of claim 2, wherein said support straps have slots therein to permit relative adjustment of said mounting base and said support straps.

4. The map holder of claim 2, together with an L-shaped connector between said clamps and said support straps for adding further adjustability therebetween.

5. The map holder of claim 4, wherein said pivotally mounted transparent cover is provided with a pair of extending pins for complementary engagement with apertures provided in the rear side portions of said compartment.

6. The map holder of claim 2, wherein said pivotally mounted transparent cover is provided with a pair of extending pins for complementary engagement with apertures provided in the rear side portions of said compartment.

7. The map holder of claim 1, wherein said means for mounting and aligning said compartment on said mounting base includes a central aperture in said compartment bottom and a similar aperture in said mounting base, said pivot pin extending through said apertures, and said detent means for retaining said adjustment once made comprises a pin and aperture.

8. The map holder of claim 7, wherein said detent means includes a single pin depending from the bottom of said compartment, and two complementary holes in said mounting base with the pin fitting into one or the other in order to provide North and South or East and West orientation of the compartment.

9. The map holder of claim 8, wherein said means for adjustably mounting said mounting base on the handlebars include a clamp having a portion encircling a portion of said handlebars, and support straps between said clamps and said mounting base.

10. The map holder of claim 9, wherein said support straps have slots therein to permit relative adjustment of said mounting base and said support straps.

11. The map holder of claim 7, wherein said pivot pin includes an elongate head pin extended through said apertures, and said biasing means comprises a spring means engaged between one end of the pin and the mounting base, whereby said compartment bottom and mounting base are yieldably separable a limited distance to disengage the detent means and enable the compartment to be turned relative to the mounting base.

* * * * *